United States Patent [19]

Kambour

[11] Patent Number: 4,745,029

[45] Date of Patent: May 17, 1988

[54] TRANSPARENT BLENDS OF POLYMETHYL METHACRYLATE AND BPA POLYCARBONATE

[75] Inventor: Roger P. Kambour, Schenectady, N.Y.

[73] Assignee: General Electric Company, Schenectady, N.Y.

[21] Appl. No.: 915,472

[22] Filed: Oct. 6, 1986

[51] Int. Cl.$^4$ ............................................. B32B 27/36
[52] U.S. Cl. .................................... 428/412; 525/148; 427/358; 428/442
[58] Field of Search .................... 525/148, 468, 146; 428/412; 427/358

[56] References Cited

U.S. PATENT DOCUMENTS

| | | | |
|---|---|---|---|
| 3,661,685 | 5/1976 | Osteen | 161/1 |
| 4,336,348 | 6/1982 | Margotte | 525/146 |
| 4,461,868 | 7/1984 | Lindner et al. | 525/67 |
| 4,540,623 | 9/1985 | Im et al. | 428/220 |
| 4,595,729 | 6/1986 | Fox et al. | 525/147 |

FOREIGN PATENT DOCUMENTS

| | | |
|---|---|---|
| 0137686 | 4/1985 | European Pat. Off. . |
| 3230491 | 2/1984 | Fed. Rep. of Germany . |
| 49-353 | 1/1974 | Japan . |
| 50-135157 | 10/1975 | Japan . |
| 1182807 | 3/1970 | United Kingdom . |

OTHER PUBLICATIONS

Kasajima et al., "Influence of Temperature on Flow Characteristics of Blended Polymer Melts Comprising Polycarbonate and Poly(methyl methacrylate) Resins", *Kobunshi Ronbunshu*, vol. 38, No. 4 (Apr. 1981), pp. 239-244.

Polanska et al., "Blends of Polycarbonate with Poly(methyl methacrylate) I. Method for Preparation of Blends & Calorimetric Studies", *Polimery* (Warsaw), 25(10) (1980) pp. 365-368.

Kohman et al., "Characteristics of Polycarbonate-poly(methyl methacrylate) Mixtures on the Basis of Studies of Dynamic Mechanical Properties", *Polimery* (Warsaw), 21(6) (1976) pp. 258-260.

Polanska et al., "Polycarbonate-poly(methyl methacrylate) Blends, II. Mechanical Properties", *Polimery* (Warsaw), 25(11), (1979), pp. 396-400.

Antychowicz et al., "Study of the Properties of Polycarbonate-poly(methyl methacrylate) Blends, *Polimery* (Warsaw), (1980), 25(6), pp. 193-197.

Razinskaya et al., "Phase Structure & Properties of Polymethyl Methacrylate-Polycarbonate Mixtures", *Polymer Science USSR*, 27(1), (1985), pp. 204-213.

"Optical Disc Structure, Method & Apparatus Physically Optimized for Writing & Reading with a Single Wavelength", Research Disclosure #20634 (Jun. 1981), pp. 237-240.

Gardlund, "Properties & Morphology of Poly(methyl methacrylate)/Bisphenol A Polycarbonate Blends", Polymer Blends & *Composites in Multiphase Systems*, ACS Adv. in Chem. Series 206, CD Hen, Ed. (1984), pp. 129-148.

Primary Examiner—Theodore E. Pertilla
Attorney, Agent, or Firm—William A. Teoli; James C. Davis, Jr.; James Magee, Jr.

[57] ABSTRACT

Transparent blends of polymethyl methacrylate and BPA polycarbonate are provided resulting from solution casting and melt blending procedures. The blends are useful as glazing materials and for making optical disks and other injection moldable articles for which an easy flow polycarbonate is desirable.

4 Claims, No Drawings

TRANSPARENT BLENDS OF POLYMETHYL METHACRYLATE AND BPA POLYCARBONATE

BACKGROUND OF THE INVENTION

Prior to the present invention, BPA polycarbonate, which hereinafter will mean polycarbonate obtained by preferably using 2,2-bis-(4-hydroxyphenyl)-propane or "Bisphenol-A" to produce the polycarbonate backbone, was utilized in a variety of applications requiring high impact resistance. On the other hand, polymethyl methacrylate, "PMMA", found wide use in glazing applications based on its high transparency, its comparatively high modulus of elasticity, and its high degree of scratch resistance and weathering resistance, particularly U.V. resistance. However, PMMA glazing suffers from low impact strength and from low heat distortion resistance. BPA polycarbonate also finds wide use in glazing applications based on its superb impact toughness, and its high heat resistance. However, BPA polycarbonate in comparison with PMMA has lower transparency, elastic modulus, scratch resistance, and weathering (UV) resistance. It would be desirable, therefore, to make transparent blends of BPA polycarbonate and PMMA to provide improved glazing materials and applications such as optical discs, combining many of the advantages of both BPA polycarbonate and PMMA. It is generally recognized, however, that PMMA and BPA polycarbonate are not miscible and blends would therefore be expected to be hazy or cloudy.

The present invention is based on my discovery that blends of BPA polycarbonate and polymethyl methacrylate, as defined hereinafter, can be cast as transparent films having a lower critical solution temperature (LCST) exceeding 120° C., i.e. capable of remaining transparent unless heated to exceed such temperature. However, depending upon the nature of the polymethyl methacrylate, that is, whether it is free-radical polymerized or anionically-polymerized, and depending on the nature of the chain ends, e.g., alkyl mercapto groups, carboxyl groups, hydrogen atoms, etc., the ability to resist phase separation, that is, to become cloudy, can in some instances exceed temperatures as high as 300° C. As a result, there is also provided by the present invention, melt processable blends of BPA polycarbonate and PMMA which can be converted to improved glazing materials and transparent optical discs.

STATEMENT OF THE INVENTION

There is provided by the present invention transparent blends of BPA polycarbonate and polymethyl methacrylate having lower critical solution temperatures (LCST) exceeding 140° C., comprising by weight (A) 25 to 95 parts of BPA polycarbonate having an intrinsic viscosity (IV) of from 0.35 to 1.8 dl./g. in chloroform at 25° C., and (B) 75 to 5 parts of polymethyl methacrylate having a weight average molecular weight $M_W$ of from about $10 \times 10^3$ to $500 \times 10^3$.

There is also provided by the present invention, melt processable transparent blends of BPA polycarbonate and polymethyl methacrylate having a lower critical solution temperature (LCST) exceeding 200° C., comprising by weight, (C) 100 parts of BPA polycarbonate having an intrinsic (IV) of from 0.35 to 1.0 dl./g. in chloroform at 25° C., (D) 5 to 95 parts of anionically polymerized polymethyl methacrylate having a $M_W$ of from $10 \times 10^3$ to $260 \times 10^3$, or (E) 5 to 40 parts of a free radical polymerized polymethyl methacrylate having a $M_W$ of from $2 \times 10^3$ to $20 \times 10^3$.

Among the polycarbonates which can be used in the practice of the invention, there are included those formed from the following bisphenols: p,p'bisphenol-A m,p-bisphenol-A, o,p-bisphenpl-A, spirobiindane bisphenol and tetramethyl bisphenol-A. Copolycarbonates containing the above bisphenols as the major bisphenol constituents are also included. Also included are bisphenol-A poly(ester carbonate)s in which the bisphenol-A carbonate moieties are the major constituents.

Among the polymethyl methacrylates which can be utilized in the practice of the present invention, there are included: syndiotactic, isotactic and heterotactic polymers in accordance with the aforementioned $M_W$ limits that include (a) Free radical resins terminated with any of the chain terminators, such as dialkyl mercaptans or nitrobenzene, known to those skilled in the art.

(b) Anionic resins polymerized with anionic initiators, such as sodium biphenyl or phenyl magnesium bromide and terminated with methanol, carbon dioxide or other Lewis acids.

In addition, minor amounts of other acrylic monomers, such as methyl acrylate and polar vinyl monomers such as acrylonitrile and maleic anhydride can be used in combination with methyl methacrylate in forming copolymers useful in the present invention.

In a further aspect of the present invention, there is provided a method for making a transparent blend of BPA polycarbonate and polymethyl methacrylate having a lowerer critical solution temperature exceeding 140° C. which comprises:

(A) solution blending in an organic solvent at a temperature in the range of from about 0° C. to 130° C., 25 to 95 parts of an aromatic polycarbonate and 75 to 5 parts of polymethyl methacrylate, and (B) applying the solution of (A) onto a substrate to a thickness of up to 10 mil/per pass at a temperature of up to 130° C. to effect the separation of the organic solvent from the resulting film.

Suitable organic solvents useful for casting the films are tetrahydrofuran, chlorobenzene, dichlorobenzene, methylene chloride, trichloroethylene and tetrachloroethane.

It has been found that to achieve transparency, it is preferred to remove the solvent to produce a tack-free film within a minute or less.

In order that those skilled in the art will be better able to practice the present invention, the following examples are given by way of illustration and not by way of limitation. All parts are by weight and the term $M_W$ or molecular weight means weight average molecular weight.

EXAMPLE 1

There was dissolved 0.5 g. of p,p'-BPA polycarbonate having a $M_W$ of 22,000 in 20 cc. of tetrahydrofuran at 23° C. Several drops of the solution were spread on a glass plate. A multilayer film made from the aforementioned procedure was found to be completely clear even at a thickness of up to 1 to 2 mils. This showed that the polycarbonate film was free of crystallinity.

Subsequently, 0.5 g. of a polymethyl methacrylate (Rohm and Haas Co.) which had been polymerized to a molecular weight of about 105,000 by a free radical mechanism and dissolved in 20 cc of tetrahydrofuran was added to 18 cc. of the above described BPA polycarbonate solution. A clear solution was obtained. A uniformly thick layer of the solution of about 2½ inches by 7 inches in area was then drawn out onto a substrate using a 6 mil doctor blade. Evaporation of the solvent took place sufficiently rapidly that a tack-free film resulted in less than one minute. A second layer of solution was drawn out on top of the first layer and similarly dried. Upon drying, there was obtained a completely transparent film having a thickness of about 0.5 to 0.7 mils. Additional transparent films were cast at 60° C. following the same procedure.

Sections of the above transparent films were then vacuum dried at a temperature below 100° C. and placed between glass cover slips. These assemblies were then placed on a hot plate. In one instance, the temperature of the hot plate was raised steadily to 150° C. and in another case the temperature was first set at 150° C., the assembly placed on the hot plate and held for ½ hour and then the hot plate temperature raised to 155° C. In both cases, cloudiness developed at 155° C. A possible explanation was that phase separation had occurred resulting in one phase richer in PMMA and the other phase richer in polycarbonate. The cloud temperature "$T_c$" of the blend was therefore 155° C.

The above film casting procedure was repeated except there was used a 20 cc tetrahydrofuran solution containing 0.05 g. each of an anionically polymerized PMMA of Scientific Polymer Products, Inc., having a molecular weight of 194,000 and a p,p'-BPA polycarbonate having a molecular weight of about 30,000. A film was spread on a glass plate at 65° C. using a 6 mil. doctor blade. The resulting film was found to be partly cloudy. A possible explanation is that the molecular weights of the BPA polycarbonate and the PMMA component were too high to achieve transparency. Cloudy as-cast films were also obtained when m,p-BPA polycarbonate having a $M_W$ of about 49,000 was used with a free radical polymerized PMMA from Aldrich Chemical having a molecular weight of about 12,000 and a PMMA from Scientific Polymer Products, Inc. having a molecular weight of about 194,000.

With respect to the above results, it is widely understood by those skilled in the art that molecular weight plays a critical role in polymer blend miscibility. That is, the higher the molecular weight of either resin the less likely the blend will be a single-phase. If the blend has two or more phases and the resins have different refractive indices—which is the case for PMMA and BPA polycarbonate—the blend will be cloudy.

It is, moreover, accepted widely that for the class of blend series in which increase in molecular weight of either resin eventually brings about a transition from one-phase to two-phase behavior, that phase separation in a 50/50 blend is expected whenever the following relationship is satisfied approximately:

$$\frac{1}{N_A} + \frac{1}{N_B} \leq K$$

where $N_A$ and $N_B$ are the weight average number of repeat units in polymer A and polymer B respectively and K can be a constant independent of $N_A$ and $N_B$ at fixed temperature for the blend series under examination. It is seen that the equation may be satisfied with various combinations of $N_A$ and $N_B$. Specifically, making $N_A$ large may be compensated for by making $N_B$ small and vice versa.

In the present context, this means that the higher is the molecular weight of the BPA polycarbonate, the lower the molecular weight should be of the PMMA if a single phase transparent blend is to be achieved, and vice versa.

EXAMPLE 2

Following the film casting procedure of Example 1, a solution of 0.2 g. of Cat. No. 20,033-6 polymethyl methacrylate from Aldrich Chemical Company, having a molecular weight of about 12,000 and 0.2 g. of a p,p'-BPA polycarbonate having a molecular weight of about 17,600 (IV=0.41 dl./g.) in 20 cc. of tetrahydrofuran was cast on a glass plate using a doctor blade at 23° C. The resulting clear film was dried in a vacuum oven overnight at 80° C. Pieces of the film were then placed between a pair of glass covered slides and the assembly placed on a hot plate. The temperature of the hot plate was raised from ambient to 220° C. over a period of 55 min. During this period, the transparency remained unchanged by comparison with that of the original film. Differential scanning calorimetry of the original film exhibited a single $T_g$ of about 123° C. indicating complete miscibility. Those skilled in the art would know that the aforementioned plastic would be suitable as an easy flow melt processable polycarbonate, or useful as an optical disc or in a variety of injection molded parts the geometry of which make mold filling difficult with neat BPA polycarbonates.

EXAMPLE 3

In accordance with the procedure of Example 1, a clear film containing equal parts by weight of isotactic polymethyl methacrylate from Polysciences, Inc., having a molecular weight of 184,000 and a p,p'-BPA polycarbonate having an intrinsic viscosity of 0.37 dl/g was cast from tetrahydrofuran and vacuum dried overnight at 110° C. A piece of the film was heated between cover slips from 130° C. to 220° C. over about 8 minutes. Haziness began to develop at about 205° to 210° C.

EXAMPLE 4

A clear film containing equal parts by weight of a free radical polymerized polymethyl methacrylate, from Monomer-Polymer-Dajac Laboratories having a molecular weight of about 29,000, and a p,p'-BPA polycarbonate having a molecular weight of 17,000 was cast from tetrahydrofuran at 60° C. The film was dried at 100° C. in vacuum and then heated between cover slips. The film developed cloudiness at about 140° to 155° C.

EXAMPLE 5

A clear film containing equal parts by weight of anionic polymethyl methacrylate from Scientific Polymer Products, Inc. having a molecular weight of 81,000 and a p,p'-BPA polycarbonate having an intrinsic viscosity of 1.02 dl/g was cast from chlorobenzene at 110° C. The film was dried in vacuum at 110° C. overnight and subsequently placed between cover slips and heated slowly on a hot plate. The film remained transparent to above 290° C.

Those skilled in the art would know that the above transparent blend of polymethyl methacrylate and BPA polycarbonate would be useful as an extrudable glazing material having improved weathering resistance, scratch resistance and optical clarity compared to neat BPA polycarbonate.

EXAMPLE 6

A 20/80 mixture by weight of PMMA from Aldrich Chemical having a molecular weight of about 12,000 and p,p'-BPA polycarbonate having a molecular weight of about 31,900 was dry blended and then compression molded, for melt rheology. Characterization in an RDS 7700 dynamic spectrometer of Rheometrics, Inc. was obtained to determine complex melt viscosity values at low and high frequency for the blend and the neat polycarbonate from 220° C. to 260° C. and 240° C. to 300° C., respectively. The following results were obtained where "PC" indicates polycarbonate melt viscosity values and "Blend" indicates melt viscosity values of the blend.

| | Melt Viscosity (poise) | | | |
|---|---|---|---|---|
| | $\omega = 500$ rad/sec | | $\omega = 10$ rad/sec | |
| T(°C.) | PC | Blend | PC | Blend |
| 230 | — | $2.90 \times 10^3$ | — | $4.22 \times 10^3$ |
| 240 | $2.99 \times 10^3$ | $2.56 \times 10^3$ | $6.08 \times 10^3$ | $3.19 \times 10^3$ |
| 250 | — | $1.76 \times 10^3$ | — | $1.98 \times 10^3$ |
| 260 | $2.08 \times 10^3$ | $.987 \times 10^3$ | $2.61 \times 10^3$ | $1.07 \times 10^3$ |
| 280 | $1.17 \times 10^3$ | — | $1.22 \times 10^3$ | — |
| 300 | $6.44 \times 10^3$ | — | $.635 \times 10^3$ | — |

The resulting material was recovered as a transparent plastic from the RDS spectrometer after the melt viscosity measurements were completed. As shown in the above table, melt viscosity of the blend is significantly lower than the melt viscosity of the polycarbonate at high speeds (500 Rad/second) and low speeds (10 Rad/second). Those skilled in the art would know that the blend would be useful as an easy flow injection moldable transparent polycarbonate having low birefringence as compared to the corresponding polycarbonate free of polymethyl methacrylate.

EXAMPLE 7

The following example further illustrates how the invention can be practiced:

Equal parts of p,p'-BPA polycarbonate dry powder of IV=0.37 dl./g. and anionic polymethyl methacrylate powder of $M_W = 100 \times 10^3$ are mixed thoroughly and are dried in an air oven at 100° C. overnight. The mixture is extruded with a twin screw extruder and is pelletized. The pellets can be prevented from reabsorbing moisture, and are injection moldable in an injection molding machine containing an optical disc mold at barrel temperatures above 200° C. and below 300° C. The discs are transparent and can exhibit low birefringence relative to neat polycarbonate discs and reduced moisture pickup relative to neat polymethyl methacrylate discs.

Although the above examples are directed to only a few of the very many variables which can be utilized in the practice of the present invention, it should be understood that the present invention is directed to a much broader variety of transparent blends of polymethyl methacrylate and polycarbonate as shown in the description preceding these examples. It will also be understood by those skilled in the art that agents that confer useful properties on otherwise transparent glassy thermoplastics at the expense of transparency, such as pigments, glass fibers and rubber modifiers may be added to these one-phase BPA polycarbonate PMMA blends.

What is claimed and sought to be protected by Letters Patent of the United States is as follows:

1. A method for making a transparent blend of BPA polycarbonate, and polymethyl methacrylate having a lower critical solution temperature of at least 140° C. which comprises
   (A) solution blending 25 to 95 parts of a BPA polycarbonate having an intrinsic viscosity in chloroform of from 0.35 to 1.8 dl./g. at 25° C. and 75 to 5 parts of a polymethyl methacrylate having a weight average molecular weight as determined by membrane osmometry and gel permeation chromatography of from $10 \times 10^3$ to $500 \times 10^3$ in an organic solvent,
   (B) applying the resulting solution onto a substrate to a thickness of up to one mil per pass, and
   (C) allowing the organic solvent to evaporate to produce a transparent polycarbonate/polymethyl methacrylate blend.

2. Transparent blends of BPA polycarbonate and polymethyl methacrylate made in accordance with claim 1, having lower critical solution temperatures of at least 140° C. which comprise by weight
   (A) 25 to 95 parts of BPA polycarbonate having an intrinsic viscosity in chloroform of from 0.35 to 1.8 dl./g. at 25° C., and
   (B) 75 to 5 parts of a polymethyl methacrylate having a weight average molecular weight $M_W$ of from about $10 \times 10^3$ to $500 \times 10^3$ as determined by membrane osmometry and gel permeation chromatography.

3. A transparent blend in accordance with claim 1 where the polymethyl methacrylate is a polymethyl methacrylate which is made by free radical polymerization.

4. A transparent blend in accordance with claim 1 where the polymethyl methacrylate is made by anionic polymerization.

* * * * *